US012568877B1

(12) United States Patent
Velez Gonzalez

(10) Patent No.: US 12,568,877 B1
(45) Date of Patent: Mar. 10, 2026

(54) RAKE TONGS ADAPTER

(71) Applicant: Jose N Velez Gonzalez, Isabela, PR (US)

(72) Inventor: Jose N Velez Gonzalez, Isabela, PR (US)

( * ) Notice: Subject to any disclaimer, the term of this patent is extended or adjusted under 35 U.S.C. 154(b) by 416 days.

(21) Appl. No.: 18/129,248

(22) Filed: Mar. 31, 2023

Related U.S. Application Data

(60) Provisional application No. 63/340,966, filed on May 12, 2022, provisional application No. 63/333,583, filed on Apr. 22, 2022.

(51) Int. Cl.
*A01D 7/00* (2006.01)
(52) U.S. Cl.
CPC ...................................... *A01D 7/00* (2013.01)
(58) Field of Classification Search
CPC .................................... A01D 7/00; A01D 7/10
See application file for complete search history.

(56) References Cited

U.S. PATENT DOCUMENTS

| | | | |
|---|---|---|---|
| 3,643,410 A | * | 2/1972 | Menning .................. A01D 7/10 |
| | | | 294/50.8 |
| 4,037,397 A | * | 7/1977 | Fiorentino ............... A01D 7/10 |
| | | | 294/50.8 |
| 2022/0248598 A1 | * | 8/2022 | Besler ...................... A01D 7/10 |
| 2023/0138223 A1 | * | 5/2023 | Birch ....................... F16B 2/06 |
| | | | 56/400.12 |

* cited by examiner

*Primary Examiner* — Cathleen R Hutchins
(74) *Attorney, Agent, or Firm* — Luis Figarella

(57) ABSTRACT

Interface adapters are shown that allow, with minimal modification, the coupling of two separate rakes for use as 'scissor yard waste tongs' while at the same time allowing for their separate use as 'regular' rakes. These adapters provide the significant advantage of allowing ergonomically correct motions for their operators, while they minimize the need to bring additional tools in performing their work tasks.

4 Claims, 12 Drawing Sheets

100

102

104

204

202

200

212

208          206

210

302′          202          300

204          304′

206

208

500

208

206

600

304'

302'

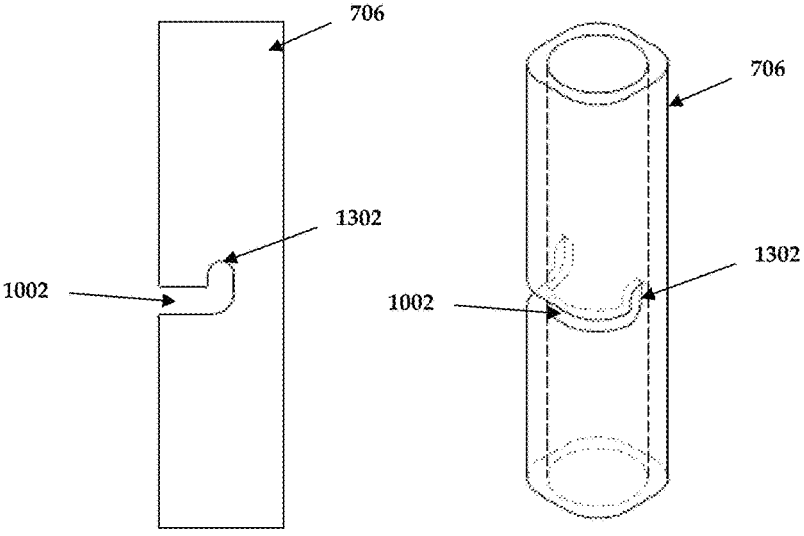
Figure 13                    Figure 14
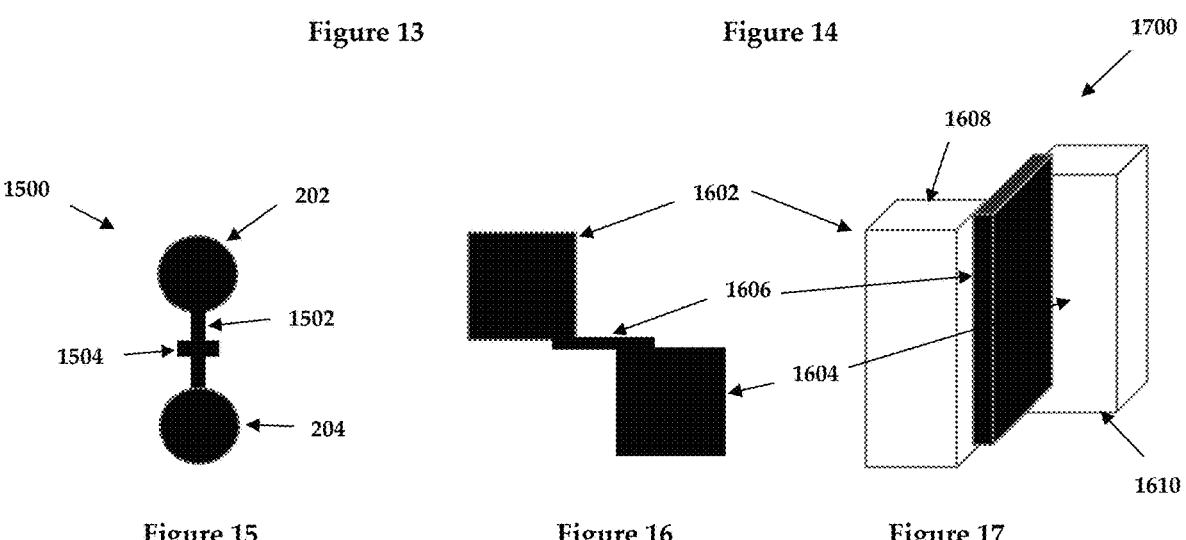
Figure 15          Figure 16          Figure 17

RAKE TONGS ADAPTER

CROSS-REFERENCE TO RELATED APPLICATIONS

This application claims priority to co-pending U.S. Provisional patent applications Ser. No. 63/333,583 titled "Collection and Transportation Rake Assembly", filed on Apr. 22, 2022, and Ser. No. 63/340,966 titled "Collection and Transportation Rake Assembly", filed on May 12, 2022, the disclosure of both are herein incorporated by reference in their entirety.

PATENTS CITED

The following documents and references are incorporated by reference in their entirety, Clark (U.S. Pat. No. 4,866, 922), Feldman (U.S. Pat. No. 11,229,159), Oakes (U.S. Pat. Pub. No. 2020/0305359) and Billado et al (U.S. Pat. Pub. No. 2007/0033916).

FIELD OF THE INVENTION

The invention relates generally to the field of landscaping, and in particular to a tool that allows the users to rake and collect debris with minimal effects to their backs.

DESCRIPTION OF THE RELATED ART

Yard maintenance requires performing many tasks, such as planting, weeding, mowing, digging, and raking. Raking in particular, often requires touching leaves and other ground debris. These actions bring the risks of being bitter or worse by all kinds of critters within the debris, as well as being pierced by objects within the debris. The lifting of leaves and debris, often forces the use of noisy leaf blowers, or the constant bending to pick up the debris.

Multiple lawn and garden tools are often needed to perform these tasks, and many of the available tools are heavy and may put excessive stress on the user's upper body and back, especially after repeated use. Unfortunately, what ends up happening with so many 'special use' tools, is that they simply clutter the shed or garage.

Ideally, a leaf and yard debris collection and transportation device should provide a way for a user to collect, secure, and transport leaves and other garden debris with minimal exertion while remaining in an upright standing position, without putting strain on the back, neck, legs, or arms and, yet would operate reliably and be manufactured at a modest expense. Thus, a need exists for a reliable leaf and yard debris collection and transportation device to avoid the above-mentioned problems.

SUMMARY OF THE INVENTION

This section is for the purpose of summarizing some aspects of the present invention and to briefly introduce some embodiments. Simplifications or omissions may be made to avoid obscuring the purpose of the section. Such simplifications or omissions are not intended to limit the scope of the present invention.

All references, including any patents or patent applications cited in this specification are hereby incorporated by reference. No admission is made that any reference constitutes prior art. The discussion of the references states what their authors assert, and the applicants reserve the right to challenge the accuracy and pertinence of the cited documents. It will be clearly understood that, although a number of prior art publications are referred to herein, this reference does not constitute an admission that any of these documents form part of the common general knowledge in the art.

It is acknowledged that the term 'comprise' may, under varying jurisdictions, be attributed with either an exclusive or an inclusive meaning. For the purpose of this specification, and unless otherwise noted, the term 'comprise' shall have an inclusive meaning—i.e., that it will be taken to mean an inclusion of not only the listed components it directly references, but also other non-specified components or elements. This rationale will also be used when the term 'comprised' or 'comprising' is used in relation to one or more steps in a method or process.

In one aspect, the invention is about an adapter for converting two rakes into scissor tongs, said adapter comprising a receiver for hosting a sliding assembly, said receiver comprising a top opening for securing the upper handle of a first rake, and a lower opening for securing the lower portion of said first rake, both of said openings having handle securing components, a central opening having a bolt horizontally across said opening and said sliding assembly comprising: one or more openings having securing components, a top and lower opening so that a rake handle may be slid along, and a notched slot along the middle having a top notch on said sliding assembly. In another aspect, said opening securing components include one or more of: screw, nails, rivets, pressure sleeves or chemicals.

In one aspect, the invention is about a method for using an adapter for converting two rakes into scissor tongs, said method comprising: providing a receiver for hosting a sliding assembly, said receiver comprising: a top opening for securing the upper handle of a first rake, and a lower opening for securing the lower portion of said first rake, both of said openings having handle securing components a central opening having a bolt horizontally across said opening and said sliding assembly comprising: one or more openings having securing components, a top and lower opening so that a rake handle may be slid along, and a notched slot along the middle having a top notch on said sliding assembly, creating a slot to match said notched slot on said second rake handle, sliding said second rake handle into the opening on said receiver and notching said notched slot onto said bolt. In another aspect, said opening securing components include one or more of: screw, nails, rivets, pressure sleeves or chemicals.

In one aspect the invention is about an adapter for converting two rakes into scissor tongs, said adapter comprising an interface piece formed by two interconnected handle hosting pieces a first piece into whose top opening goes the bottom of the second rake handle a second piece into whose bottom goes the top of the bottom of said second handle a first rake handle and a screw going into the scissoring point of both rake handles. In another aspect said opening securing components include one or more of: screw, nails, rivets, pressure sleeves or chemicals. In yet another aspect, a gap plate joining said two interconnected handle hosting pieces, two or more nuts along said screw to set the separation between said handles.

Other features and advantages of the present invention will become apparent upon examining the following detailed description of an embodiment thereof, taken in conjunction with the attached drawings, which are provided for purposes of illustration and not of limitation.

BRIEF DESCRIPTION OF THE DRAWINGS

FIGS. 9 and 26 show side views of proposed interface fixtures, according to exemplary embodiments of the invention.

FIGS. 13, 24 and 25 show side views of proposed interface fixture sliding assemblies, according to exemplary embodiments of the invention.

FIG. 14 shows an isometric view of a proposed interface fixture sliding assembly, according to an exemplary embodiment of the invention.

FIGS. 15 and 19 show top views of the 'scissoring point', according to exemplary embodiments of the invention.

FIGS. 16 and 20 show top views of the proposed interface pieces, according to exemplary embodiments of the invention.

FIGS. 17 and 21 show isometric views of the proposed interface fixtures, according to exemplary embodiments of the invention.

FIGS. 22 and 23 show isometric views of the proposed interface fixtures mounted with rakes, according to an exemplary embodiment of the invention.

Figure 1:
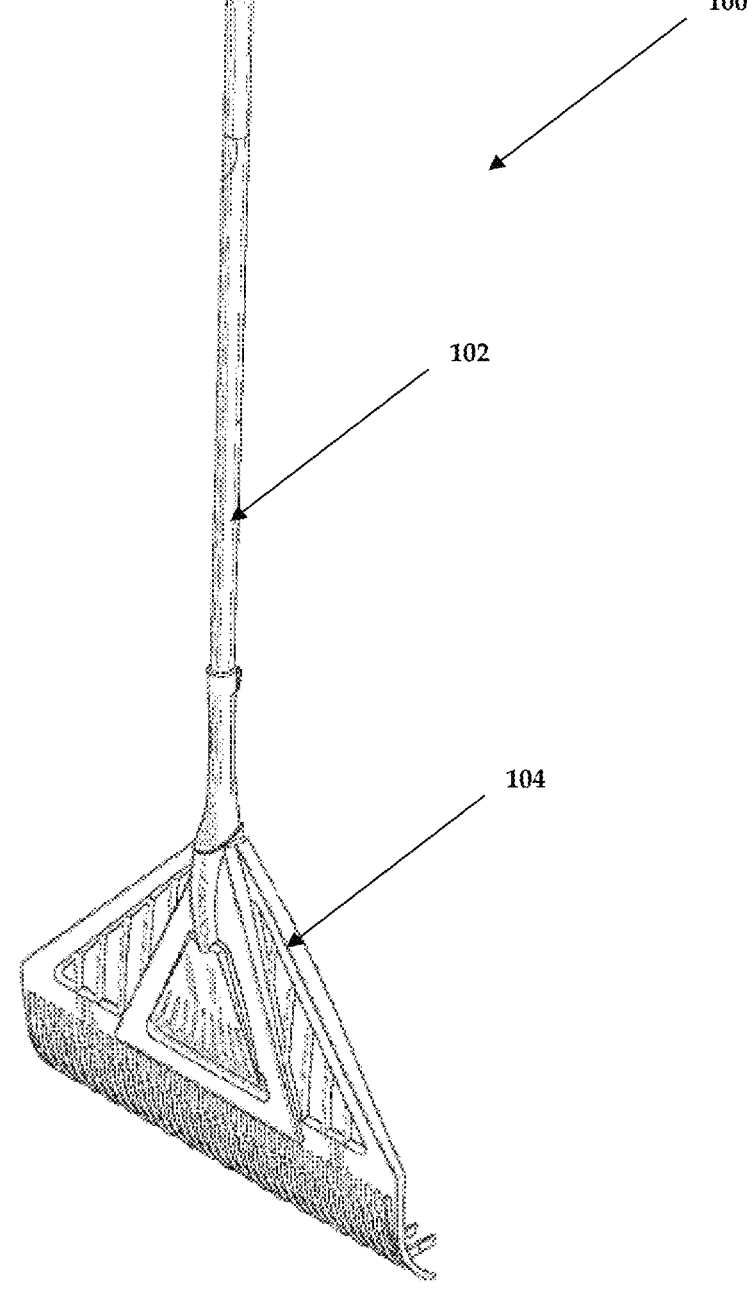
FIGS. 1-4 show various aspects of the simplest combined rakes, according to the prior art.
Figures 2, 3:
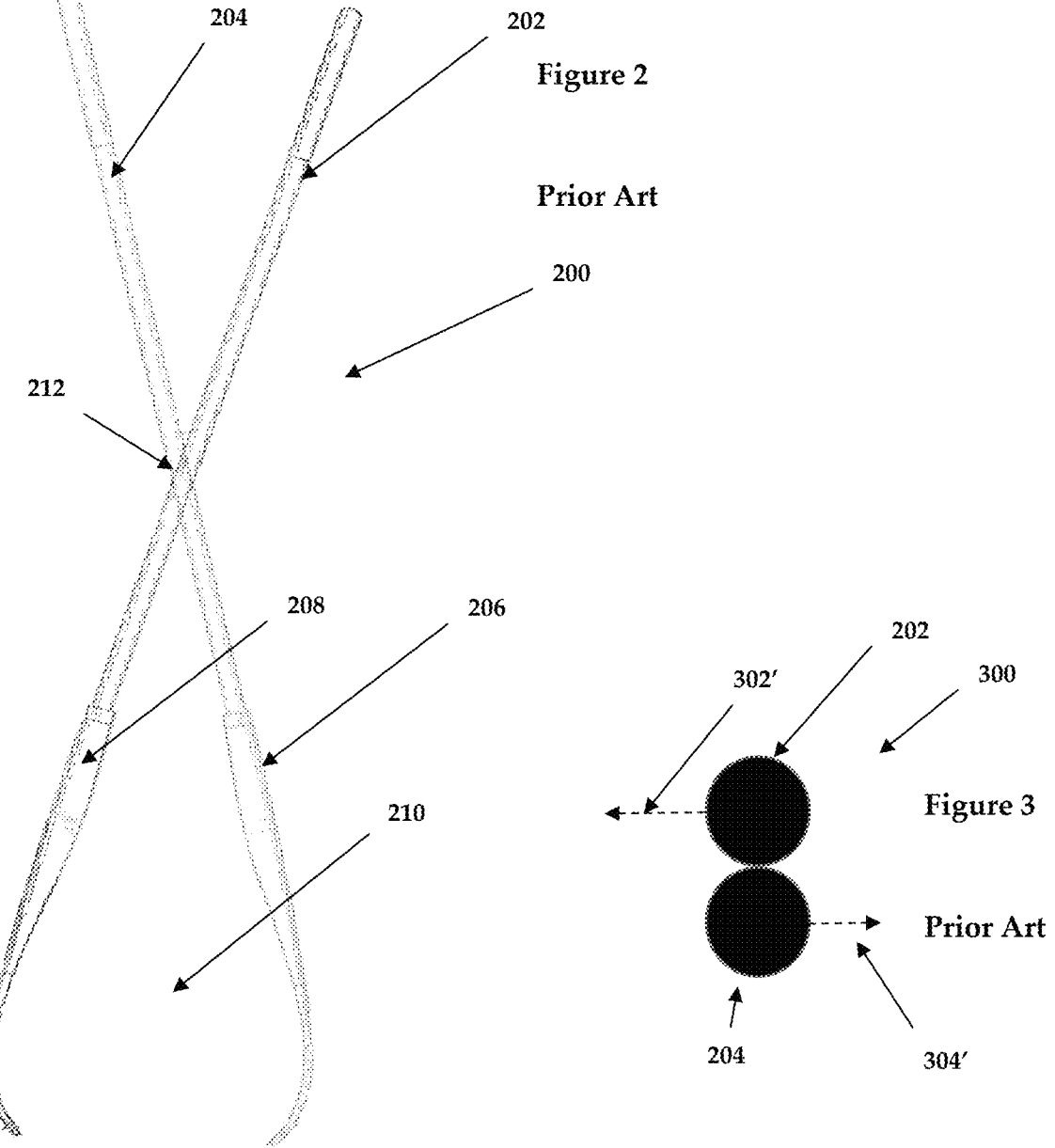
Figures 4, 5, 6:
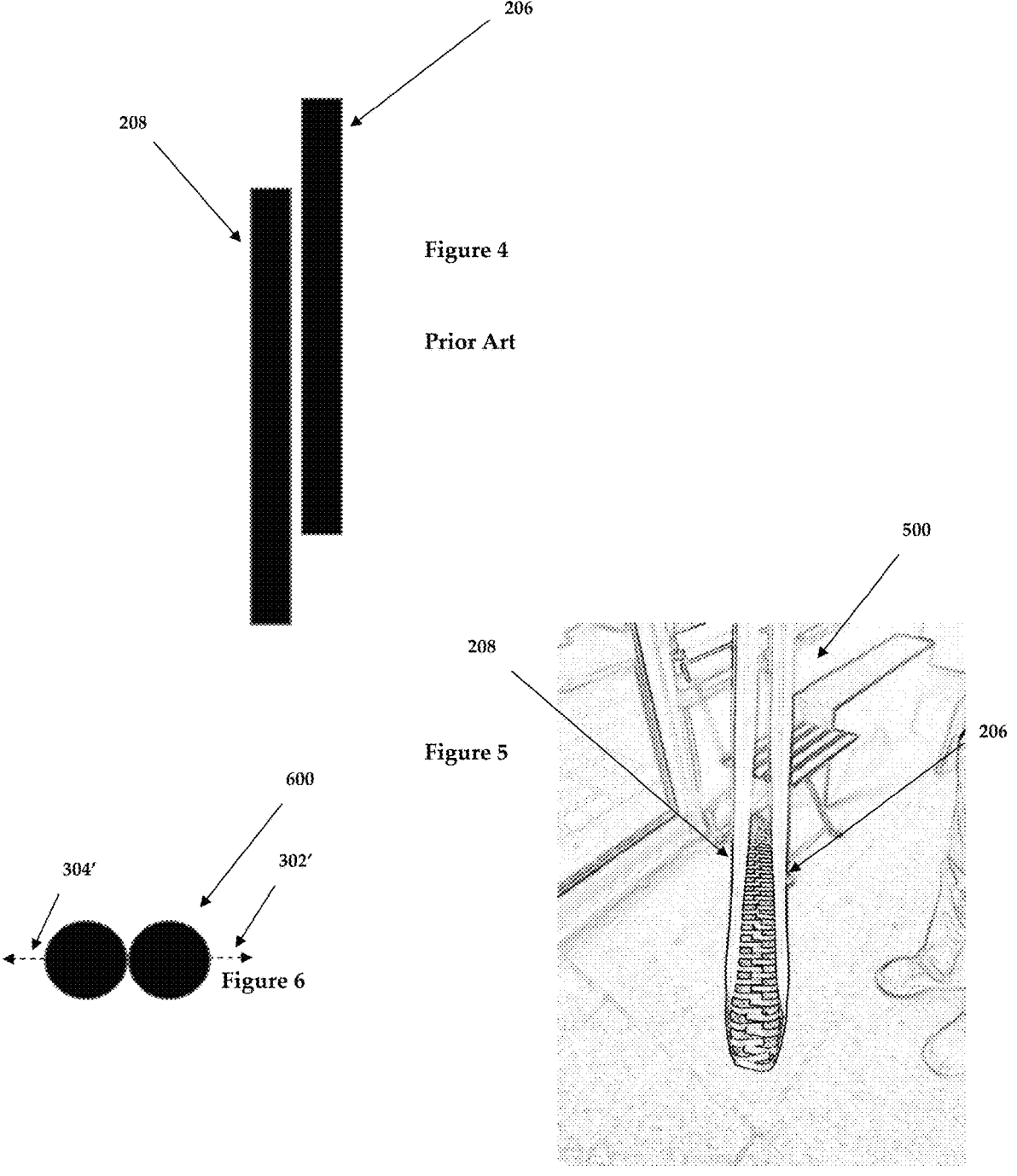
FIG. 5 shows an isometric view of the desired rake head positions for optimal collection, according to an exemplary embodiment of the invention.
FIG. 6 shows a top view of the rake handles position for optimal operator comfort, according to an exemplary embodiment of the invention.
Figures 7, 8:
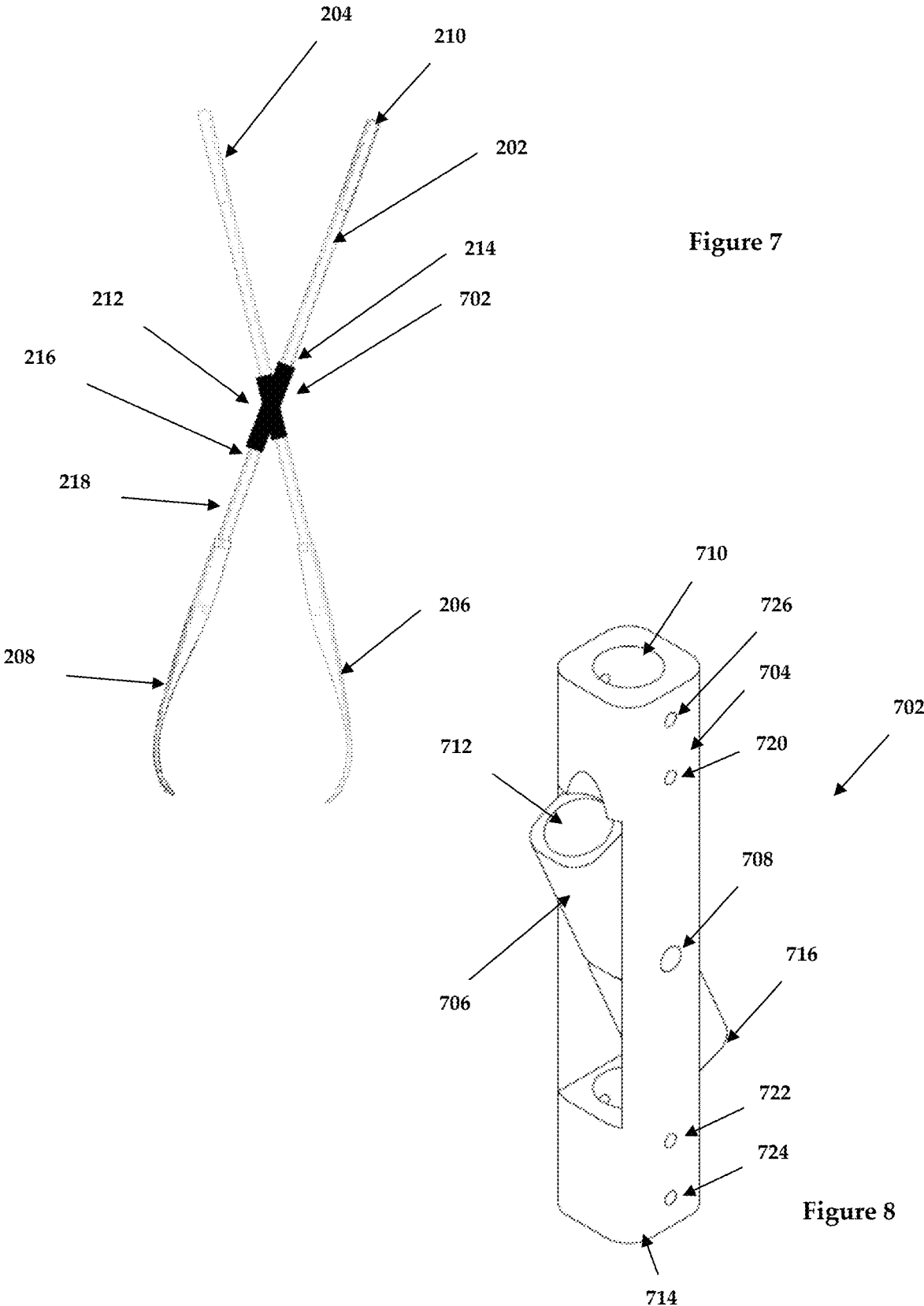
FIG. 7 shows a side view of the rakes with a proposed interface fixture, according to an exemplary embodiment of the invention.
FIG. 8 shows an isometric view of a proposed interface fixture, according to an exemplary embodiment of the invention.
Figure 9:
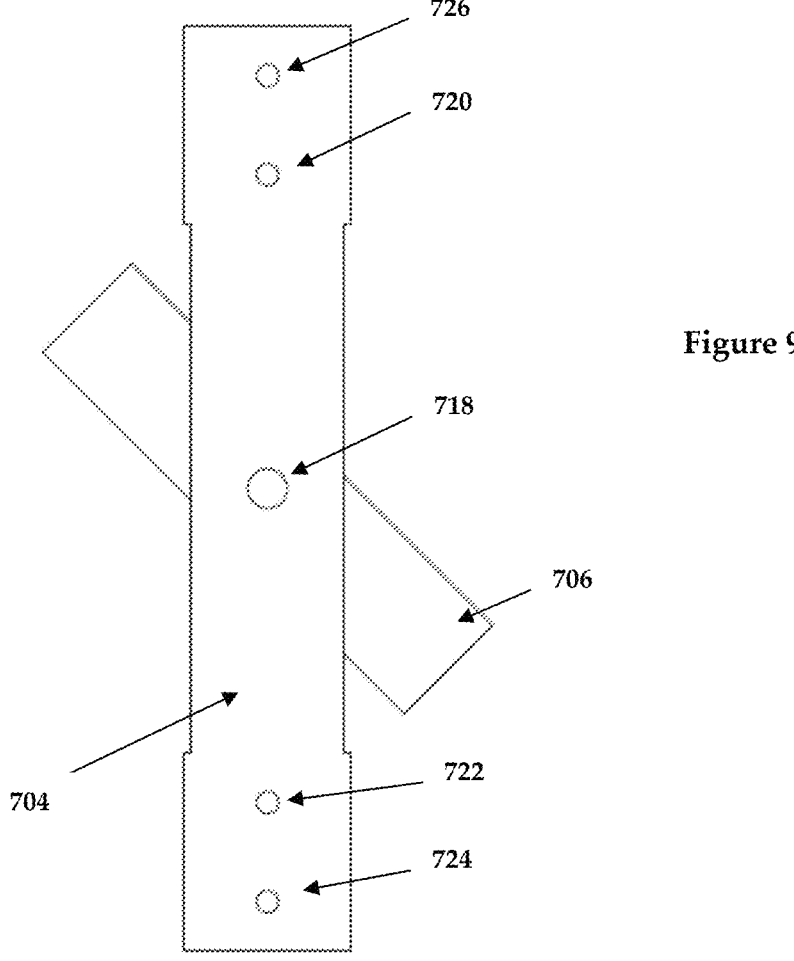
Figures 10, 11, 12:
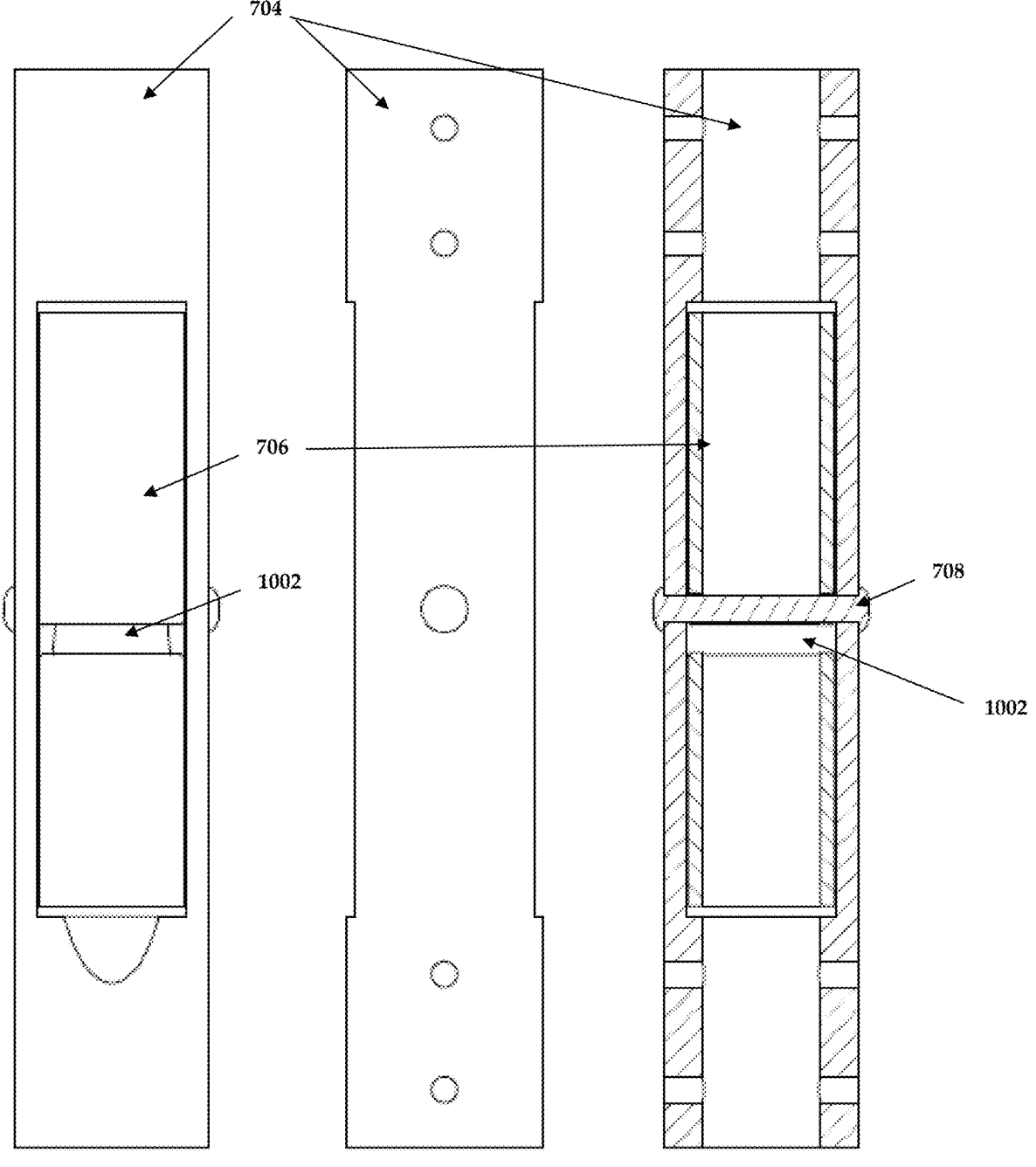
FIG. 10 shows a front view of a proposed interface fixture, according to an exemplary embodiment of the invention.
FIG. 11 shows a side view of a proposed interface fixture receiver, according to an exemplary embodiment of the invention.
FIG. 12 shows a back view of a proposed interface fixture receiver, according to an exemplary embodiment of the invention.
Figure 18:
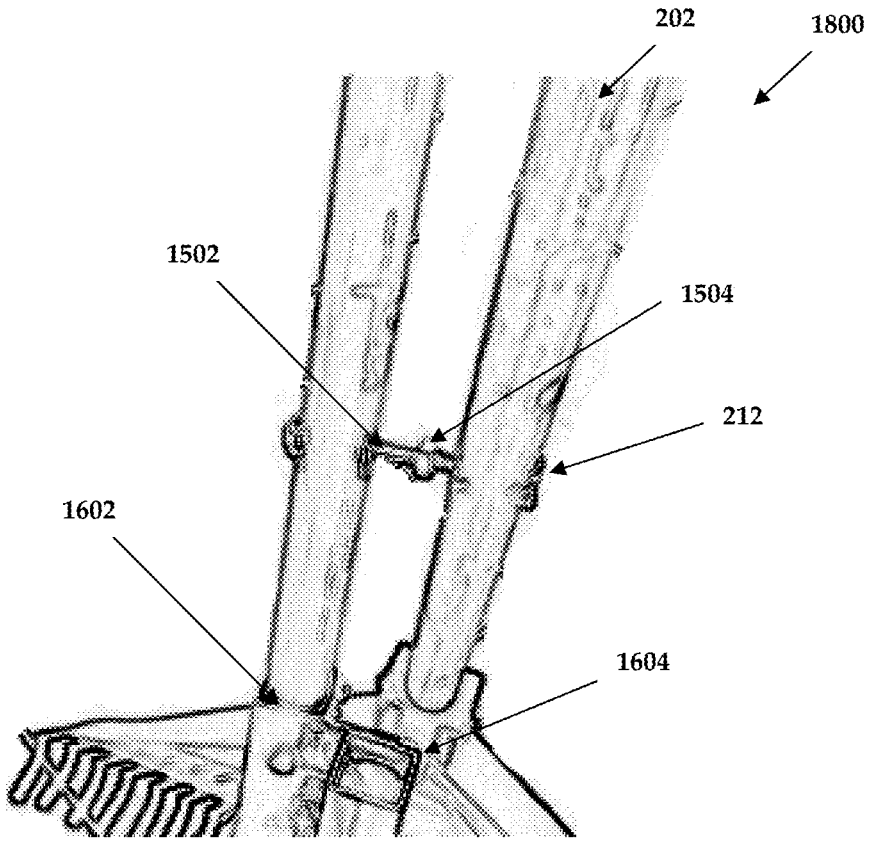
Figures 19, 20, 21, 22:
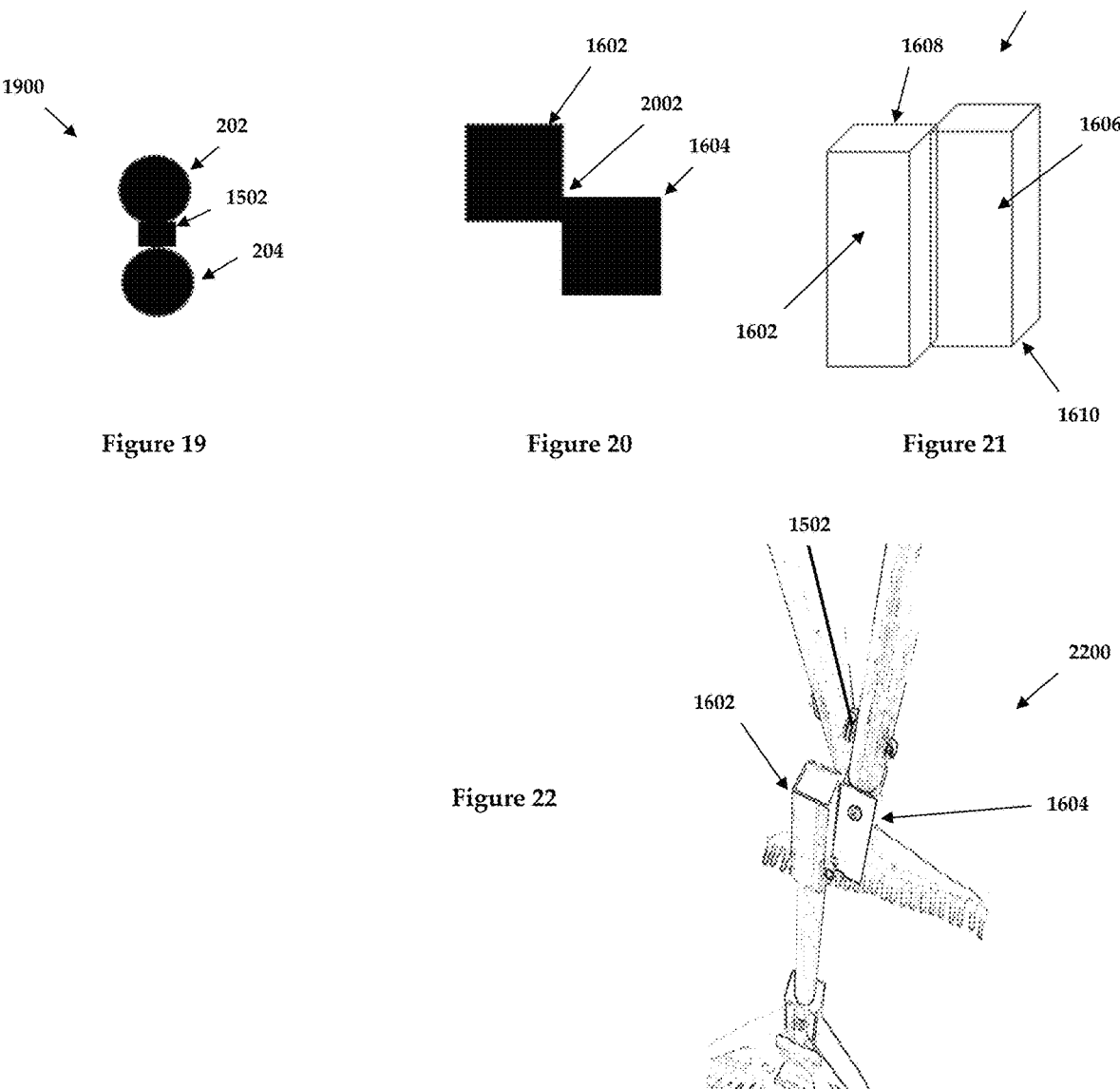
Figure 23:
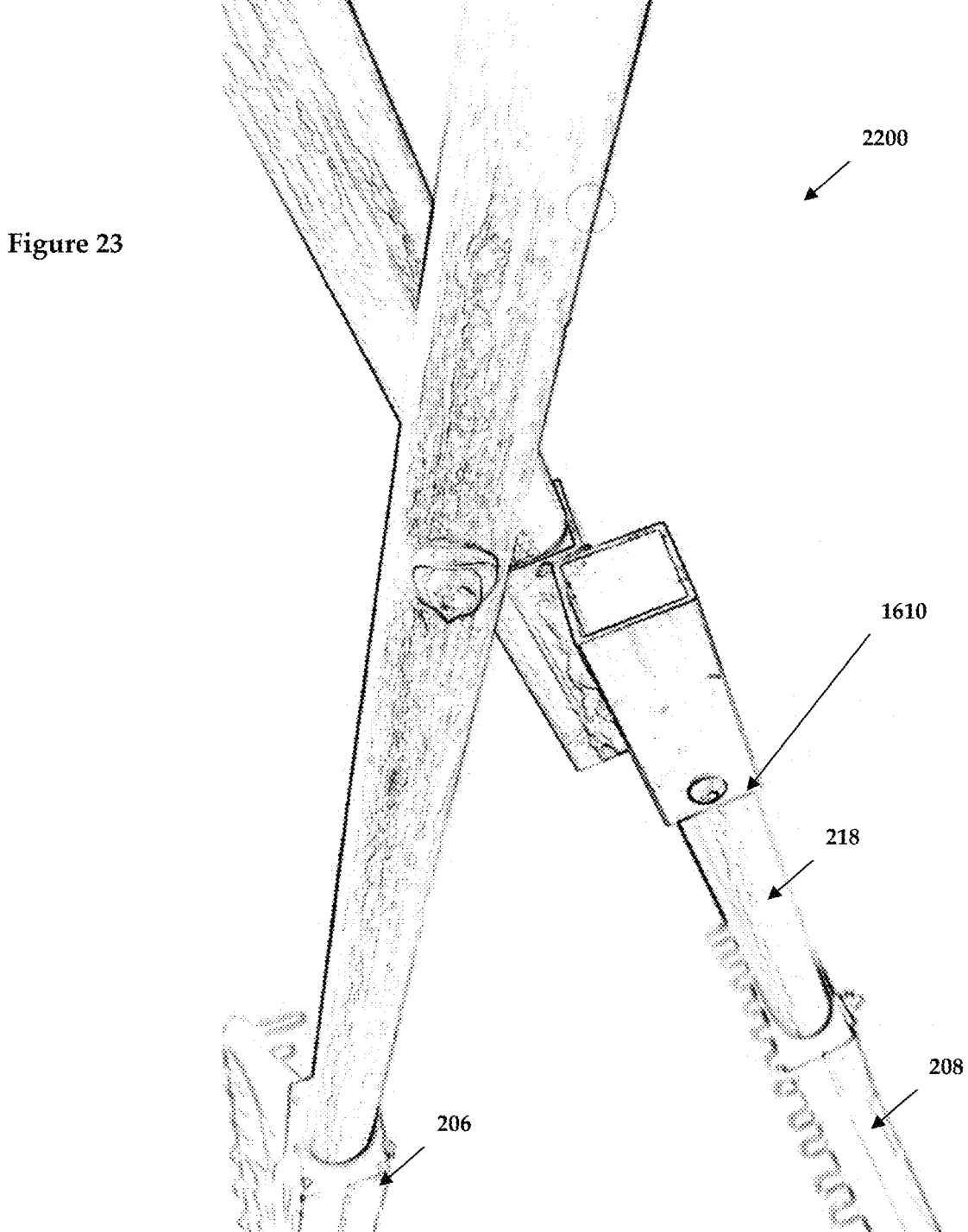

The above-described and other features will be appreciated and understood by those skilled in the art from the following detailed description and drawings.

DETAILED DESCRIPTION OF THE INVENTION

To provide an overall understanding of the invention, certain illustrative embodiments and examples will now be described. However, it will be understood by one of ordinary skill in the art that the same or equivalent functions and sequences may be accomplished by different embodiments that are also intended to be encompassed within the spirit and scope of the disclosure. The compositions, apparatuses, systems and/or methods described herein may be adapted and modified as is appropriate for the application being addressed and that those described herein may be employed in other suitable applications, and that such other additions and modifications will not depart from the scope hereof.

As used in the specification and claims, the singular forms "a", "an" and "the" include plural references unless the context clearly dictates otherwise. For example, the term "a transaction" may include a plurality of transaction unless the context clearly dictates otherwise. As used in the specification and claims, singular names or types referenced include variations within the family of said name unless the context clearly dictates otherwise.

Certain terminology is used in the following description for convenience only and is not limiting. The words "lower," "upper," "bottom," "top," "front," "back," "left," "right" and "sides" designate directions in the drawings to which reference is made, but are not limiting with respect to the orientation in which the modules or any assembly of them may be used.

When picking up yard waste and/or leaves, a common solution (FIGS. 1-4) has been to convert two separate rakes 100 into 'scissor salad tongs', by joining them 200 in a 'side-by-side' arrangement 300 at a 'scissoring' point 212 along the length of the handle 102/202/204 so that the head 104/206/208 squeezes the waste/leaves in the area 210 within the heads 206/210 in response to the handles motion 302/304. However, a common result of such an arrangement, is that the heads, when closed, are mis-aligned.

The solution in salad tongs, is to make the width of the handle 102 along the point 212 'flat', so that they operate easily and with aligned heads 104/206/208. Unfortunately, if one does that with a rake, the change in the handle 102 from tubular to flat often results in the handle 102 breaking.

A proposed solution (FIGS. 5-14) is to create a non-flat interface fixture 702 comprised of a receiver 704 hosting a sliding assembly 706 that allows for the handles 202/204 to be 600 touching along the separating portions (instead of side-by-side), so that the operator motion when 'tonging' the waste/leaves resembles that of scissors 'separating/joining' 302'/304'. The scissoring point 212 is defined by the bolt 708, along which the sliding assembly 706 rotates when secured and around which the 'scissoring point' 212 rotates.

To create the assembly, a first handle 202 is cut where desired, creating an upper first handle 210 (having a near end 216 at the top and a distal end 214 which is secured into the receiver top opening 710), and a lower first handle 218 having a near end secure into the lower opening 714 of the receiver 704.

The sliding assembly 706 has a top opening 712 and a bottom opening 716 so that the second rake 204 handle may be slid along the complete length of the sliding assembly, secured to said sliding assembly 706, and then a channel 1402 is created (either by cutting/routing if made from wood) or creating/matching if made from metal/plastic), so that a notched slot 1002 is created into which the bolt 708 goes, coming to rest into the top notch 1302 when the sliding assembly 708 'rests' within the receiver 204. This provides the 'tong' effect when the handles 202/204 are opened/closed 300'/302' during operation.

Figure 24:
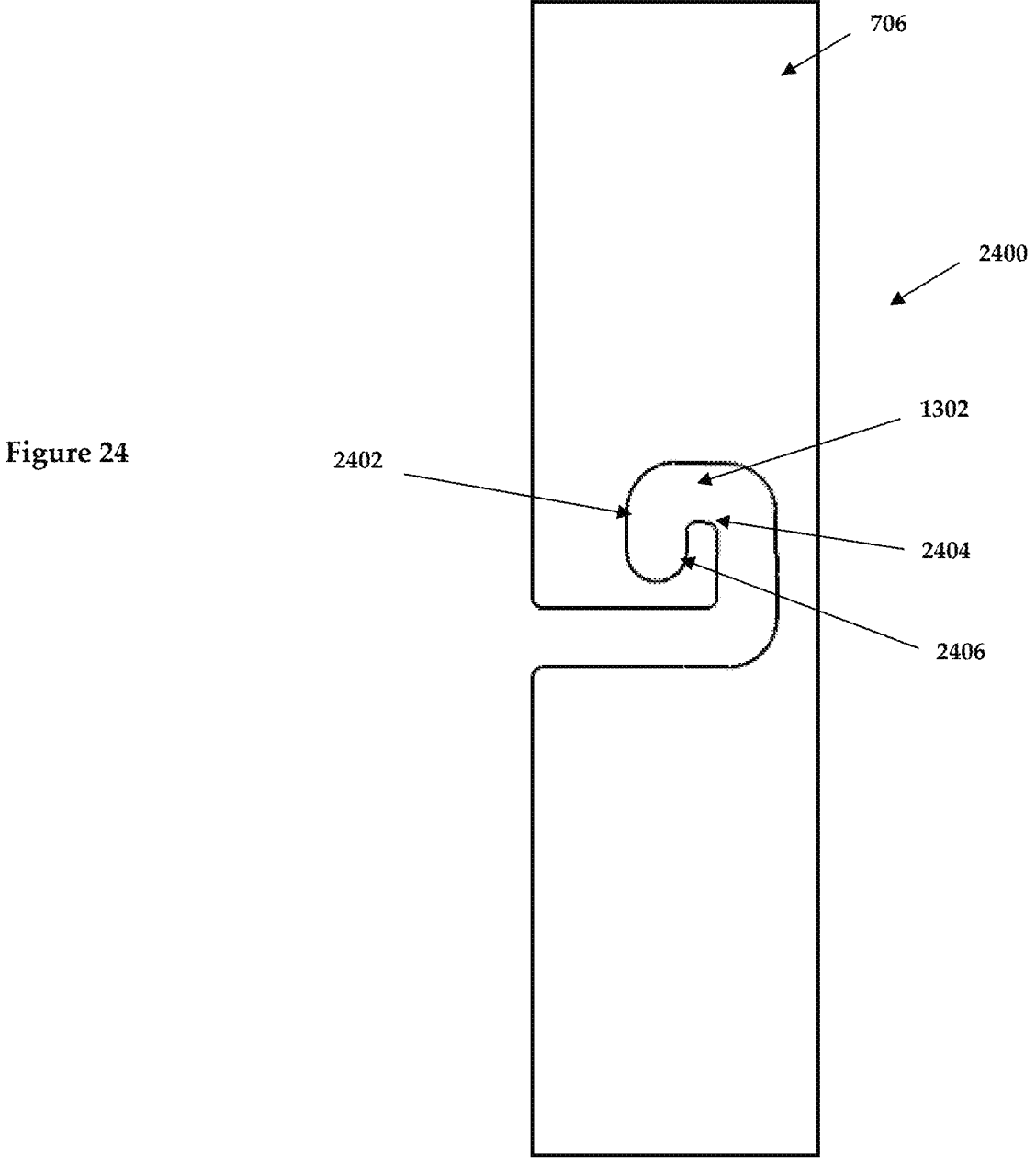

In another embodiment 2400 (FIG. 24), the top notch 1302, channel 1002/2402/2404 or the bolt 708 is equipped with clip/notch or other detaining mechanisms located so that once the bolt 708 goes past a certain point of the channel 1002/2402/2404 close to the center 1302/2406 it is secured and getting it released requires an additional step (Human releasing it). A similar effect may be created by forming a hook along the edge of the notch 1302, particularly when the shape allows the lip 2406 to hold the bolt 708 within.

Figures 25, 26:
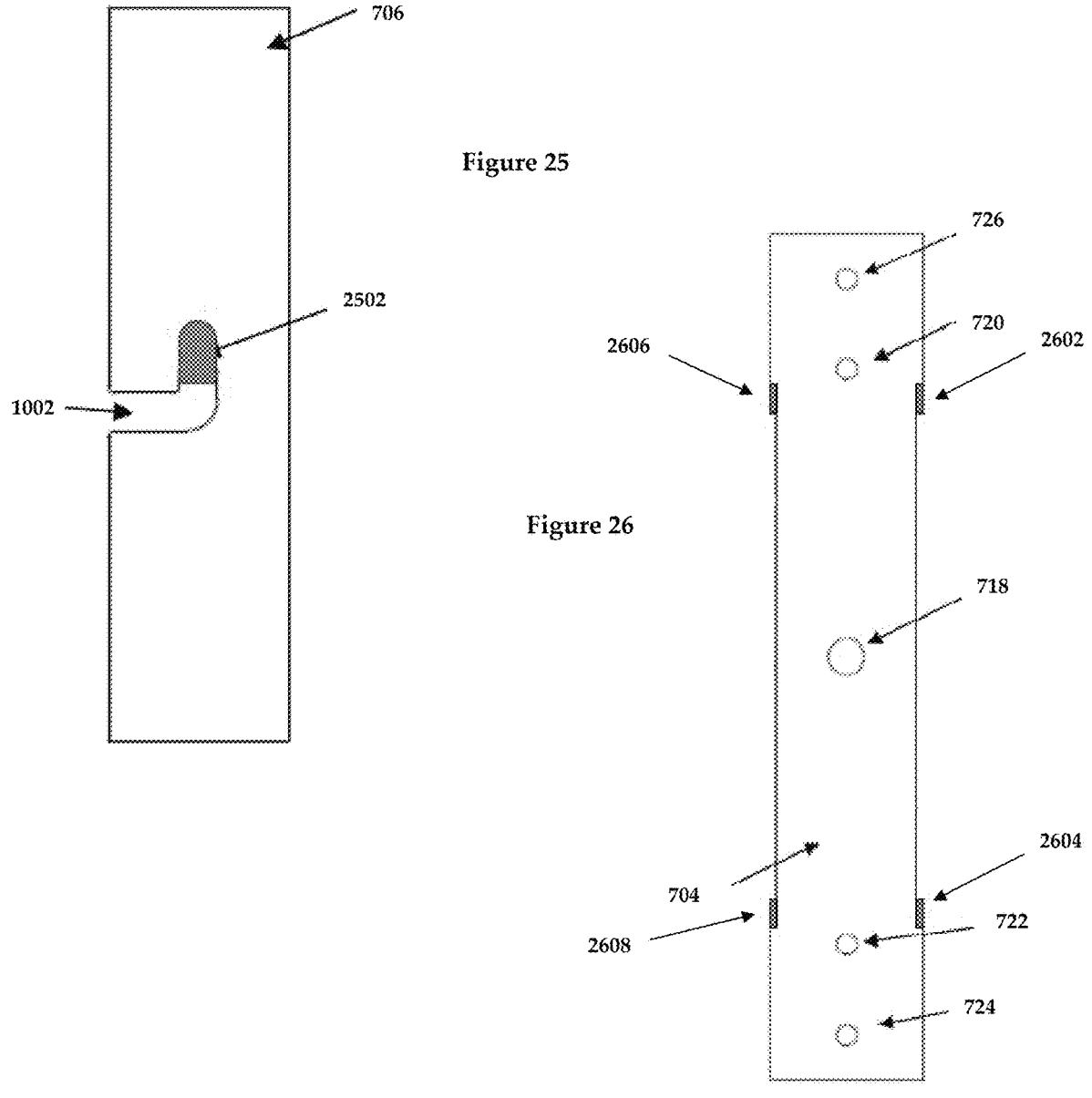

In yet another embodiment (FIGS. 25-26), the top notch 1302 of the opening is elongated 2502 by a distance that matches the top/bottom 2602/2604/2606/2008 extension of the sliding assembly 706, so that the sliding assembly 706 fits snuggly inside the receiver 704, particularly when the rakes are 'closed' 500. As before, a clip/notch located along the length of the channel may secure it.

In one embodiment, it is critical that both the bolt 708 going through the opening 718 and the center of the opening 1302/2406/2502 (where the bolt 708) be centered on the receiver 704 body and the sliding assembly 706.

The handle securing components on the openings (both upper and lower) along both the receiver and/or sliding assemblies (such as 710/712/714/716 may be accomplished via screws/nails/rivets (into/across openings 720/722/724/ 726), pressure sleeves, chemicals (glue, epoxy, etc.) or any other suitable solution.

In alternate embodiments 1700 (FIGS. 15-18) and 2200 (FIGS. 19-22) an interface piece 1700/2100 is used. A first interface piece 1602 is connected 2002 to a second piece 1604, either 'kitty cornered' 2100 or spaced by a lengthwise tab 1606. Both interface pieces 1602/1604 are sized to secure all or portions of the handles 202/204 of the rakes, with securing components similar to those described above (screws, nails, rivets, etc.).

The rake handles are inserted along their length (e.g., the second handle 204, offsetting it), so that the second head 206 is 'squared off' against the first head 208 (that which belongs to handle 202), by cutting the second handle 204 and securing a first (upper) end into 1608 the top 1602 of the adapter/interface 1700 or 2100, and the cut handle end 218 secured within the bottom 1610 of the adapter 1604. As before, the securing of the cut handle portions at points 1608/1620 may be accomplished using any of the methods describes for the interface or receiver 704 piece.

In effect, this 'offsets' the top of the handles 202/204 as shown in 1500/1900, leaving a gap between the handles defined by the separation of each adapter 1602/1604 central axis by either the presence of a gap plate 1606 or the conjoining of the adapters 2100. In this fashion, at the 'scissoring point' 212, the function of the bolt 708 is accomplished by a screw 1502 along which ends the handles 202/204 rotate, with the size of the gap between said handles (seen in 1800 vs. 2200) created and maintained by two or more nuts/spacers 1504.

Conclusion

In concluding the detailed description, it should be noted that it would be obvious to those skilled in the art that many variations and modifications can be made to the shown embodiments without substantially departing from the principles of the present invention. Also, such variations and modifications are intended to be included herein within the scope of the present invention as set forth in the disclosure.

It should be emphasized that the above-described embodiments of the present invention, particularly any "exemplary embodiments" are merely possible examples of the implementations, merely set forth for a clear understanding of the principles of the invention. Any variations and modifications may be made to the above-described embodiments of the invention without departing substantially from the spirit of the principles of the invention. All such modifications and variations are intended to be included herein within the scope of the disclosure and present invention.

The present invention has been described in sufficient detail with a certain degree of particularity. The utilities thereof are appreciated by those skilled in the art. It is understood to those skilled in the art that the present disclosure of embodiments has been made by way of examples only and that numerous changes in the arrangement and combination of parts may be resorted without departing from the spirit and scope of the invention.

The invention claimed is:

1. An adapter for converting two rakes into scissor tongs, said adapter comprising:

a receiver hosting a central sliding assembly so that the central sliding assembly crosses inside the receiver, said receiver comprising:

a top opening for securing an upper portion of a first rake, and a lower opening for securing a lower portion of the first rake, both of said top and lower openings having rake portions securing components;

a central opening having a bolt horizontally across said central opening; and said central sliding assembly comprising a top opening securing an upper portion of a second rake, and a lower opening securing a lower portion of the second rake, both of said top and lower openings of the central sliding assembly having rake portions securing components plus a central notched slot.

2. The adapter of claim 1 wherein:

said receiver top and lower openings securing components, as well as said central sliding assembly top and lower openings securing components include one or more of:

screw, nails, rivets, pressure sleeves or chemicals.

3. A method for using an adapter for converting two rakes into scissor tongs, said method comprising:

providing a receiver hosting a central sliding assembly so that the central sliding assembly crosses inside the receiver, said receiver comprising:

a top opening securing an upper portion of a first rake, and a lower opening securing a lower portion of the first rake, both of said top and lower openings having rake portions securing components;

a central opening having a bolt horizontally across said central opening; and said central sliding assembly comprising a top opening securing an upper portion of a second rake, and a lower opening securing a lower portion of the second rake, both of said top and lower openings of the central sliding assembly having rake portions securing components plus a central notched slot.

4. The method of claim 3 wherein:

said receiver top and lower openings securing components, as well as said central sliding assembly top and lower openings securing components include one or more of:

screw, nails, rivets, pressure sleeves or chemicals.

\* \* \* \* \*